United States Patent [19]
Ashcraft

[11] Patent Number: 5,762,860
[45] Date of Patent: Jun. 9, 1998

[54] METHOD OF AND APPARATUS FOR PRODUCING WATER SOLUBLE POLYMERIC TUBE

[75] Inventor: Charles Ray Ashcraft, Winston-Salem, N.C.

[73] Assignee: R. J. Reynolds Tobacco Company, Winston-Salem, N.C.

[21] Appl. No.: 619,414

[22] Filed: Mar. 21, 1996

[51] Int. Cl.⁶ .................................................. B29C 47/90
[52] U.S. Cl. .......................... 264/566; 264/568; 264/569; 264/185; 425/72.1; 425/326.1; 425/387.1
[58] Field of Search ........................ 264/563, 566, 264/185, 568, 565, 209.3, 569, 209.4, 348; 425/72.1, 326.1, 379.1, 387.1

[56] References Cited

U.S. PATENT DOCUMENTS

| | | | |
|---|---|---|---|
| 2,814,071 | 11/1957 | Allan et al. | 264/569 |
| 2,922,194 | 1/1960 | Lampard et al. | 425/72.1 |
| 2,945,258 | 7/1960 | Houston . | |
| 3,167,814 | 2/1965 | Corbett | 264/569 |
| 3,538,210 | 11/1970 | Gatto . | |
| 3,742,105 | 6/1973 | Kuroda | 264/348 |
| 3,893,465 | 7/1975 | Cheatwood . | |
| 3,976,733 | 8/1976 | Havens | 264/569 |
| 3,985,849 | 10/1976 | Notomi et al. | 264/185 |
| 4,447,387 | 5/1984 | Blakeslee et al. | 264/569 |
| 4,519,146 | 5/1985 | Herrington | 264/569 |
| 4,624,823 | 11/1986 | Audureau et al. | 264/565 |
| 5,030,404 | 7/1991 | Bonnebat et al. | 264/185 |
| 5,225,120 | 7/1993 | Graiver et al. | 264/209.5 |

FOREIGN PATENT DOCUMENTS

| | | | |
|---|---|---|---|
| 2259732 | 6/1974 | Germany | 264/569 |
| WO 95/28097 | 10/1995 | WIPO . | |

*Primary Examiner*—Jeffrey R. Thurlow

[57] ABSTRACT

A method of and an apparatus for cooling or quenching a tube extruded from a water soluble polymer includes a plurality of cooling rings with bores through which the extruded tube passes. A gaseous cooling medium, such as compressed air, is supplied to each cooling ring and is directed immediately downstream of the bore thereof to impinge upon and cool the tubing passing therethrough. The cooling medium is supplied annularly so as to maintain the just-extruded tubing concentric and keep it centered in the bore.

21 Claims, 2 Drawing Sheets

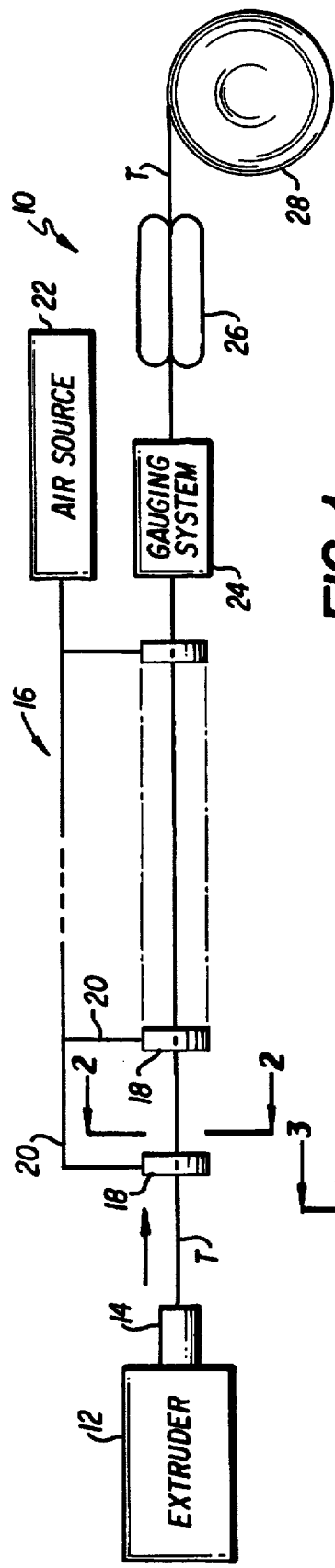
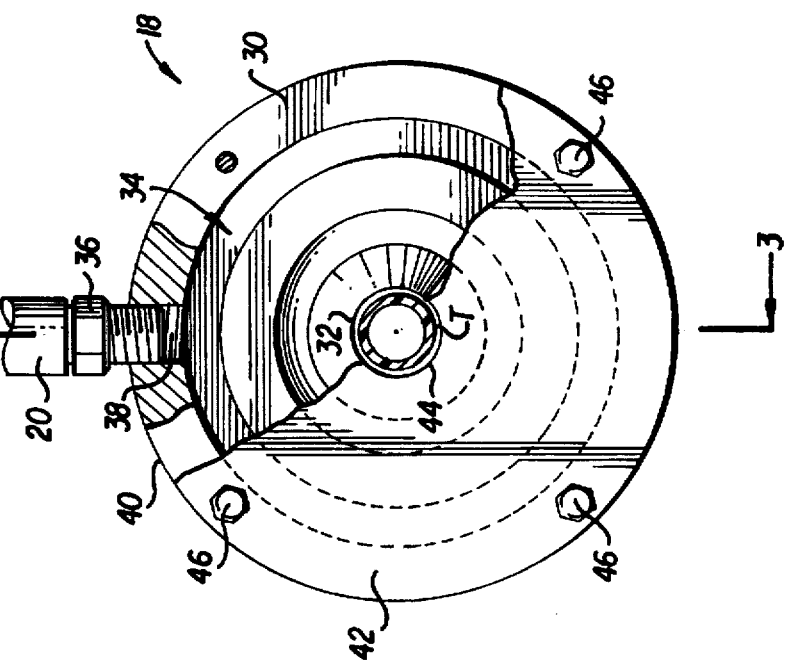
FIG. 1
FIG. 2

1

METHOD OF AND APPARATUS FOR PRODUCING WATER SOLUBLE POLYMERIC TUBE

FIELD OF THE INVENTION

The present invention relates to the extrusion of polymeric tubing and more particularly to a method of and apparatus for quenching an extruded water soluble polymeric tube.

BACKGROUND OF THE INVENTION

The extrusion of plastic tubing is well-known technology. Typically, a molten thermoplastic material is extruded from an annular orifice or die to form a continuous tubular extrudate which is water-quenched in a tank under vacuum to rapidly solidify the extrudate and maintain the concentricity of the tubing. After solidification, the tubing is cut into lengths or wound onto reels for later use. Water sprays and open water baths are also conventionally used to cool and solidify extruded plastic tubing. Some examples of conventional apparatus and methods of extruding and quenching plastic tubing are disclosed in U.S. Pat. Nos. 2,945,258; 3,538,210; and 3,893,465, the disclosures of which are incorporated herein by reference.

Such conventional apparatus and methods are not suitable for use in extruding and quenching tubing extruded from a water-soluble polymeric material, such as polyvinylalcohol (PVOH). Because it is not possible to quench water-soluble tubing with water sprays or in a water bath without solubilizing the tubing, at least to some extent, it has not been feasible to manufacture water soluble tubing by extrusion using conventional extrusion apparatus and methods with water quenching. Other nonflammable liquids which do not solubilize the plastic tubing could be used for quenching. For example, ethyl acetate or chlorofluorocarbons could be used to quench polyvinylalcohol, however, the cost of using such liquids as well as the regulatory problems associated with chlorofluorocarbons renders that solution impractical.

In view of the foregoing deficiencies of the conventional methods and apparatus, it would be desirable to provide a method of and an apparatus for quenching a water soluble polymeric tubing using a cooling medium other than water or other quenching liquids. It would also be desirable to provide a method of and apparatus for maintaining the concentricity and size of extruded plastic tubing without the need for surrounding the tubing with sub-atmospheric pressure.

SUMMARY OF THE INVENTION

The present invention is directed to a method of and an apparatus for quenching extruded polymeric tubing, particularly tubing extruded from a water soluble polymer, such as polyvinylalcohol. According to the apparatus aspects of the invention, a conventional extruder is used to extrude a water soluble polymeric tube which is then quenched or cooled by a plurality of in-line air rings disposed in spaced relationship downstream of the extruder. The air rings have a unique structure which not only supplies cooling air for quenching the tubing, but also provides an annular air cushion for supporting the tubing substantially concentrically in the air ring. The air cushion is comprised of cooling air or other gaseous cooling medium, such as compressed air, nitrogen or carbon dioxide, as well as ambient air drawn into the annular space surrounding the tubing by reason of high velocity cooling air moving downstream in the direction of movement of the extruded tubing.

Because of the uniformity of air pressure and the high velocity of the flow around the periphery of the tubing, the size of the tubing can be maintained and the concentricity of the tubing is significantly improved without the need for passing the tubing through gauging or sizing apertures to control size and concentricity. Advantageously, the use of air pressure to control size and concentricity of the extrudate also avoids the necessity to directly contact the surface of the tubing thereby ensuring a smoother, more uniform surface of the tubing.

It has also been found that the present invention improves the concentricity of tubing extruded from water insoluble polymers, such as polyolefins and EVOH. In the process of extruding such water insoluble polymers, the extrudate is passed through the air quenching system of the invention to stiffen/solidify the exterior of the tubing wall and fix concentricity. Thereafter, the tubing may be passed through a conventional water tank to accelerate cooling and thus shorten the overall length of the tubing extrusion system.

The air rings of the air quenching system of the invention each comprise a specially constructed ring body fabricated of metal or plastic and having a cavity or recess formed on the downstream side thereof. The cavity is enclosed on the downstream side of the body with a plate also having a central bore to form an air plenum. The central bores of the ring and plate have a diameter about 20% to 60% greater than the diameter of the tubing to be extruded so that the cylindrical walls of the bore and plate are spaced from the outer surface of the tubing.

According to the method aspects of the invention, quenching air is introduced into the air ring at one location on the outer ring periphery and flows into an annular groove of the cavity. From the groove, the air then flows along an annular path in the cavity and exits annularly immediately downstream of the central bore in a direction inclined toward the downstream side of the ring. The quenching air impinges directly on the tubing uniformly around the tubing periphery and at a downstream inclination so as to maintain the tubing concentric and centered in the bores of the ring and plate. The air exits the ring in the same direction the tubing travels on the downstream side of the ring. This downstream flow of quenching air draws ambient air on the upstream side of the air ring into the annular space between the ring bore and the tubing to form an air cushion, increase the forces on the tubing to maintain the tubing concentric and centered in the bores and to provide additional air flow for cooling.

The air supplied to the ring is preferably compressed air at a pressure in the range of about 20 psi to about 80 psi. Other compressed gases, such as nitrogen or carbon dioxide may be used, but compressed air is preferred. According to one embodiment of the air quenching system of the invention, six air rings are arranged in spaced relation downstream of a one-inch extruder made by Killion Extruders, Inc. of Verona, N.J. A greater or lesser number of air rings may be used. Such a system is capable of quenching an extruded tube approximately 8 mm in diameter from Vinex 2144 polyvinylalcohol made by Air Products Company of Allentown, Pa.

With the foregoing and other objects, advantages and features of the invention that will become hereinafter apparent, the nature of the invention will be more clearly understood by reference to the following detailed description of the invention, the appended claims and to the several views illustrated in the drawings.

BRIEF DESCRIPTION OF THE DRAWINGS

FIG. 1 is a schematic diagram showing an extrusion line using the air quenching system of the invention;

FIG. 2 is a partly broken vertical elevation view from line 2—2 of FIG. 1 showing one air ring of the air quenching system of the invention.

DETAILED DESCRIPTION OF THE INVENTION

Figure 3:
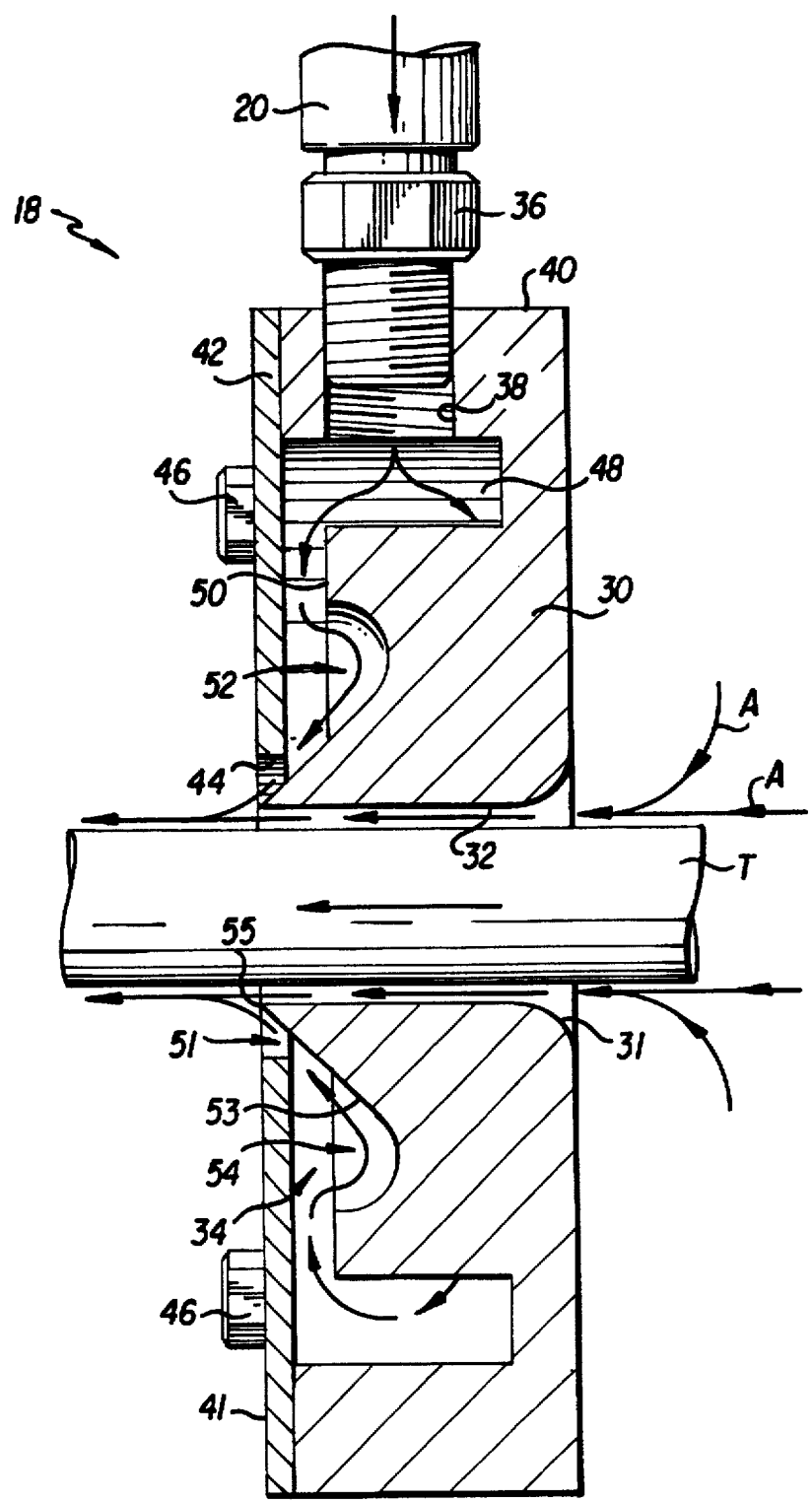
FIG. 3 is a cross-sectional view taken along lines 3—3 of FIG. 2 showing the air flow through an air ring and around the extruded tubing.

Referring now to the drawings, there is illustrated in the FIG. 1 schematic diagram a plastic tubing extrusion line constructed according to the invention which is designated generally by reference numeral 10. Extrusion line 10 includes a conventional extruder 12, such as a Killion extruder, with an annular tubing die 14 for extruding polymeric tubing T, such as a water soluble polyvinylalcohol tubing. Tubing T passes into an air quenching system 16 which comprises a plurality of air rings 18 each connected by an air line 20 to a source 22 of cooling air, such as compressed air. Downstream of the air quenching system 16 is a conventional laser gauging system 24, a tractor puller 26 and a take-up reel 28. Instead of the reel 28, a conventional tube cutter (not shown) may be provided downstream of the tractor puller 26 for cutting the tubing into predetermined lengths.

FIGS. 2 and 3 illustrate the details of the construction of the air rings 18 used in the air quenching system 16. Each air ring 18 comprises a disk-shaped ring body 30 machined of a metal, such as aluminum, or molded of any suitable plastic. The body 30 has a central bore 32 sized to be 20% to 60% greater in diameter than the extruded tubing T and gradually tapered on the upstream side thereof as shown by the curved taper at 31. The downstream side of the body 30 is machined or molded with a uniquely shaped recess or cavity 34. The air line 20 communicates with cavity 34 through a threaded nipple 36 which is threaded into a threaded hole 38 in the peripheral wall 40 of the body 30. Additional air lines 20 may be provided to communicate with cavity 34.

The recess or cavity 34 is enclosed on the downstream side of the air ring body 30 by a plastic or metal plate 42 having a central bore 44 corresponding in size to the bore 32 of the body 30. Plate 42 is sealingly affixed to the downstream side of body 30 by a plurality of screws 46 or by any other suitable means, such as bonding, welding or the like. If desired, a gasket or O-ring (not shown) may be used to provide a seal between the body 30 and plate 42.

FIG. 3 best illustrates the unique shape of the cavity 34 of the air plenum. Air flowing through line 20 and nipple 36 passes into an annular groove 48 from where it flows annularly and radially into the restricted space between the plate 42 and a raised surface or land 50. From that restricted space, the air flows into and past an expansion/compression zone 52 formed by an annular groove 54 with a depth that gradually decreases radially inwardly. A narrow annular passage 51 is formed between the surface 53 of groove 54 and the innermost edge of the bore 44 in plate 42. Groove surface 53 extends axially to an annular edge 55 which is substantially coplanar with the outermost surface 41 of plate 42. Air flowing along surface 53 impinges on the outer surface of tubing T. Because there is a flow component in the expansion/compression zone 52 in the downstream direction as well as a shorter restriction path through the bore 44 in plate 42 than through bore 32 in body 30, the air exits the air ring through the annular space between the tubing T and the bore 44 in plate 42 in a high velocity stream which quenches and solidifies the tubing extrudate T. The high velocity air exiting the ring 18 through bore 44 also creates a subatmospheric pressure in the bore 32 which draws ambient air into bore 32 as shown by the arrows A in FIG. 3. This air flow in bore 32 provides an air cushion between the tubing T and bore 32 and advantageously helps to maintain concentricity of the still-soft extrudate and keep it centered in the bores 32, 44 of the ring 18. Keeping the tubing T centered also prevents contact between the tubing and the walls of bores 32, 44 so that the surface of the tubing is maintained substantially smooth and free of scratches.

While the air quenching system of the invention is especially useful in the extrusion of water soluble tubing, it may also be used to solidify/stiffen the outer surface of tubing extruded from water insoluble polymers, especially for tubing where improved concentricity or surface finish is required. A water quench tank may be located downstream of the air quenching system of the invention to provide more rapid quenching of the extrudate.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

I claim:

1. Apparatus for extruding and cooling a polymeric tubing extrudate comprising an extruder having an annular tubing die for extruding polymeric tubing, a plurality of cooling rings disposed in spaced relation downstream of said extruder, said rings each having a bore through which said tubing passes, said bore having a continuous, impermeable side wall, at least one inlet provided in each ring, a generally annular unitary discharge outlet positioned proximate said bore along a downstream side of the ring for directing a flow of gaseous cooling medium radially inwardly along a path inclined downstream with respect to the direction of travel of said tubing, and a plenum connecting the at least one inlet to the outlet, a pressurized source of gaseous cooling medium connected to the at least one inlet of each ring for supplying the cooling medium under pressure through the outlet to the tubing after said tubing passes through each ring.

2. Apparatus according to claim 1, wherein said polymeric tubing is water soluble and said source and said rings are the only means of said apparatus for cooling said tubing.

3. Apparatus according to claim 1, wherein said gaseous cooling medium is one of compressed air, nitrogen and carbon dioxide.

4. Apparatus according to claim 1, wherein said cooling medium is compressed air at a pressure from about 20 psi to about 80 psi.

5. Apparatus according to claim 1, wherein at least one of said air rings comprises a body having a central bore through which said tubing passes, said bore having a diameter 20% to 60% greater than the outer diameter of said tubing.

6. Apparatus according to claim 1, wherein said cooling rings each comprise a body having a first central bore through which said tubing passes, said body having a cavity formed on one side of the body, a plate sealingly fixed to said side of the body with said cavity to form said plenum, said plate having said discharge outlet provided therein arranged concentrically with said first central bore such that the gaseous medium supplied to said cooling ring flows through said plenum and exits through said discharge outlet so as to impinge on the tubing that has passed through the first bore.

7. Apparatus according to claim 6, wherein said bore and said discharge outlet have substantially the same diameter.

8. Apparatus according to claim 6, wherein said cavity is formed with first and second annular grooves, said first annular groove having a diameter greater than the second annular groove, said second annular groove having a depth that decreases radially inwardly toward the first central bore to form a first annular flow restriction in said plenum.

9. Apparatus according to claim 8, wherein said first annular groove has a rectangular cross-section and including a second annular flow restriction formed between said first and second annular grooves.

10. Apparatus according to claim 8, wherein said pressurized source is connected to said ring at said inlet, said inlet communicating with said first annular groove.

11. A method of extruding and cooling a polymeric tube comprising the steps of:

extruding a polymeric tubing from an extruder;

providing a plurality of cooling rings in spaced relation downstream of said extruder, said rings each having a downstream surface, an upstream surface, a central bore extending between said downstream surface and said upstream surface, and an annular discharge outlet at said downstream surface;

passing said tubing through the central bores of said cooling rings;

delivering a gaseous cooling medium to the cooling rings:

discharging the gaseous cooling medium only through said annular discharge outlet of each of said rings radially inwardly along an annular path inclined downstream with respect to the direction of travel of said tubing at a rate for cooling said tubing and for maintaining said tubing concentric and centered in the bore of each cooling ring; and contacting said extruded tubing with said gaseous cooling medium only along said annular path immediately downstream of each cooling ring.

12. The method of claim 11, wherein said tubing is extruded from a water soluble polymer.

13. The method of claim 12, wherein said water soluble polymer is polyvinylalcohol.

14. The method of claim 11, includes the step of maintaining said tubing concentric and centered in said bore without introducing said cooling medium directly into said bore.

15. The method of claim 14, including the further step of drawing ambient air into said bore from upstream of said ring to maintain said tubing concentric and centered in said bore.

16. Apparatus for quenching and for supporting a polymeric tubing extrudate comprising a housing having an upstream side, a downstream side and a central bore with a continuous surface, said bore extending between said upstream side and said downstream side through which extruded polymeric tubing passes, at least one inlet provided in said housing, an annular discharge outlet concentric with said bore provided in said downstream side of said housing, said outlet oriented for directing a flow of gaseous cooling medium onto said tubing radially inwardly along an annular path inclined downstream with respect to the direction of travel of said tubing, and a plenum extending between and connecting said inlet and said outlet.

17. Apparatus according to claim 16, wherein said housing comprises a disc-shaped ring body having said bore extending therethrough and a plate having a central opening, said plate sealingly fixed to said body and forming said downstream side of said housing, said central opening of said plate arranged concentrically with said bore and having an outer diameter slightly larger than a diameter of said bore and an inner diameter substantially the same as said diameter of said bore, and wherein said outlet is an open region between outer edges of said central opening of said plate and outer edges of said central bore.

18. Apparatus according to claim 16, wherein said ring body has a first side that forms said upstream side of said housing, a second side opposite said first side, and a cavity formed in said second side of said body, wherein said plate is connected to said second side of said body and overlying said cavity, and wherein said plenum is defined by inner surfaces of said cavity and said plate.

19. Apparatus according to claim 18, wherein said cavity is formed with first and second annular grooves, said first annular groove having a diameter greater than the second annular groove, said second annular groove having a depth that decreases radially inwardly toward said central bore to form a first annular flow restriction in said plenum.

20. Apparatus according to claim 19, wherein said first annular groove has a rectangular cross-section and including a second annular flow restriction formed between said first and second annular grooves.

21. Apparatus according to claim 17, wherein said diameter of said bore is 20% to 60% greater than an outer diameter of said tubing.

* * * * *